United States Patent
Shatara et al.

(10) Patent No.: US 7,565,126 B2
(45) Date of Patent: Jul. 21, 2009

(54) RF RECEIVER SYSTEM HAVING SWITCHED ANTENNA DIVERSITY MODULE

(75) Inventors: Raed S. Shatara, Carmel, IN (US); Jeffrey J. Marrah, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 476 days.

(21) Appl. No.: 11/407,454

(22) Filed: Apr. 20, 2006

(65) Prior Publication Data
US 2007/0249312 A1    Oct. 25, 2007

(51) Int. Cl.
  H04B 1/06      (2006.01)
(52) U.S. Cl. ............ 455/272; 455/273; 455/277.1; 455/275; 455/289; 455/280
(58) Field of Classification Search .......... 455/272, 455/273, 277.1, 275, 276, 280, 289
See application file for complete search history.

(56) References Cited

U.S. PATENT DOCUMENTS

2002/0025793 A1* 2/2002 Meijer et al. ............. 455/277.1

OTHER PUBLICATIONS

U.S. Appl. No. 11/201,883, filed Aug. 11, 2005, Entitled "Technique for Reducing Multipath Interference in an FM Receiver," 25 pages.

* cited by examiner

Primary Examiner—Sanh D Phu
(74) Attorney, Agent, or Firm—Jimmy L. Funke

(57) ABSTRACT

An RF receiver system is provided having a plurality of selectable antennas. The system includes a receiver for receiving RF signals from one of the plurality of antennas at a time. The receiver includes processing circuitry for processing the RF signals and generating a control signal to control selection of one of the antennas at a time. The system further includes a switched diversity module having a plurality of switches coupled to the plurality of antennas for selecting one of the antennas at a time. The switched diversity module further includes logic receiving the control signal generated by the receiver and generating logic output signals to control selection of one of the antennas at a time.

20 Claims, 6 Drawing Sheets

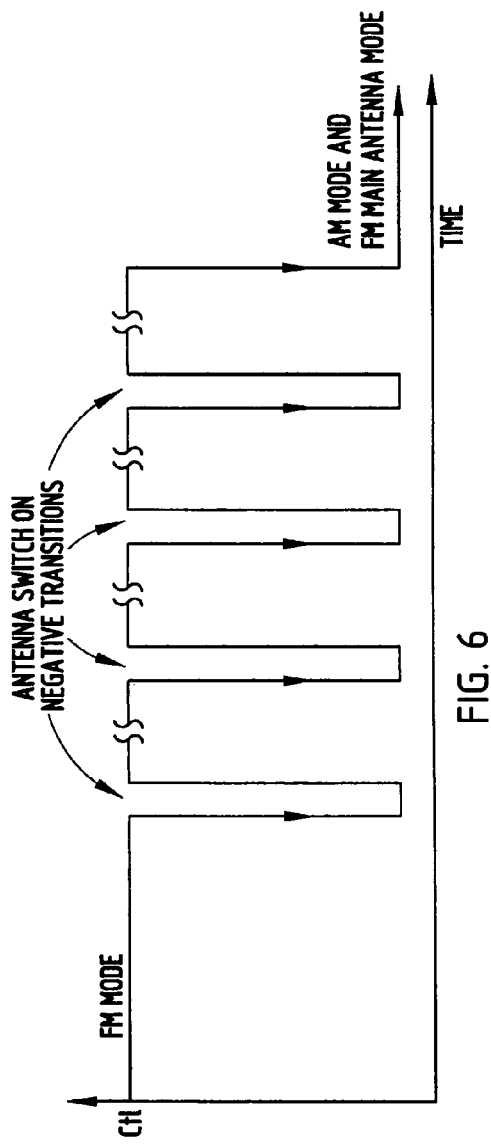
FIG. 6
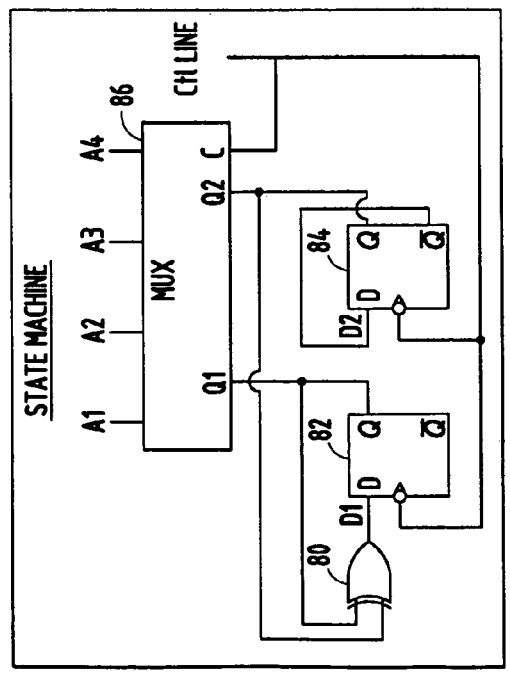
FIG. 8
FIG. 7

RF RECEIVER SYSTEM HAVING SWITCHED ANTENNA DIVERSITY MODULE

TECHNICAL FIELD

The present invention generally relates to RF receivers and, more particularly, to a remote switched antenna diversity module useful in an RF receiver system for reducing multipath distortion in a mobile FM receiver.

BACKGROUND OF THE INVENTION

Multipath interference is generally caused when two or more signal rays of an original transmitted signal converge upon a receiving antenna of a receiver system at significantly different times. This misalignment or superposition of several delayed signals, which are generally replicas of the original signal, may cause distortion in audio recovered from the signals. Distortion caused by the multipath interference may be attributable to long delay (e.g., greater than five microseconds between signals) multipath interference or short delay (e.g., less than five microseconds between signals) multipath interference.

In various radio frequency (RF) receiver systems, antenna diversity has been implemented in conjunction with an FM receiver to reduce degraded reception performance caused by multipath interference. Antenna diversity has been accomplished through the use of two or more uncorrelated antennas. Conventional antenna diversity reception from mobile communication systems has been achieved by a number of different implementations. For example, antenna diversity has been accomplished with equal gain combiner (EGC) systems, maximal ratio combiner (MRC) systems, and antenna diversity systems, such as the adaptive reception system (ARS) disclosed in U.S. Pat. No. 5,517,686, the entire disclosure of which is hereby incorporated herein by reference.

EGC and MRC systems typically utilize signals from all antennas through a variety of combining techniques that attempt to optimize the certain characteristics of the received signals. In a switched antenna diversity system, only one antenna is generally utilized for reception at any instant in time and, thus, the non-selected antennas do not contribute to the demodulated signal. The EGC and MRC systems generally may provide superior performance, however, they also tend to be more expensive to implement and may require multiple receiver analog front ends.

One example of a conventional switched antenna diversity system 100 is illustrated in FIG. 1, which operates as a fast distortion detector. The system 100 generally includes a plurality of antennas 112A-112D coupled to a remote diversity module 114 which, in turn, is coupled to a single FM receiver 130 via two RF coaxial cables 128A and 128B. The FM receiver 130 typically includes front end circuitry 134, analog-to-digital conversion (ADC) circuitry 136, an FM demodulator 138, an audio processor 140 and a buffer 142.

The receiver 130 generates and outputs an analog intermediate frequency (IF) feedback signal at about 10.7 MHz and a DC (AM/FM mode) feedback signal to the diversity module 114 via RF coaxial cable 128B. The signals output from the receiver 130 are input to an analog FM demodulator and level detector 150 in the remote diversity module 114. The analog demodulator and level detector 150 outputs FM multiplex (MPX) and level detected (AM detected) signals to threshold comparators 152 and 154, the outputs of which are filtered by spike filter 156 and dip filter 158. Decision block 160 has intelligence that selects the next antenna via decision logic 120. Essentially, when a spike in the MPX signal and a negative dip in the level detected signal are detected, the next antenna is selected via decision logic 120 which causes activation of switches 116A-116D to select one of the antennas 112A-112D. The aforementioned conventional receiver system 100 generally employs costly intelligence in the remote diversity module 114 and requires two costly RF coaxial cables 128A and 128B.

Another conventional switched antenna diversity system 100' is illustrated in FIG. 2 which employs a single RF coaxial cable 128, instead of the two coaxial cables, which reduces the cost of system 100'. Additionally, the FM receiver 130 employs a crossover network 170, and the remote diversity module 114 likewise employs a crossover network 172. The RF coaxial cable 128 transmits the RF signal, the IF signal and a DC control signal. The crossover networks 170 and 172 are added to both the receiver 130 and the remote diversity module 114 to separate the signals. In this system, the remote diversity module 114 likewise employs intelligence to determine the antenna selection. The conventional diversity modules generally require analog IF feedback signals to operate properly. In future systems, it is contemplated that low-IF digital FM receivers will be unable to adequately provide analog IF signals to the external diversity modules due to the complexity of the new receiver architecture.

It is therefore desirable to provide for a switched diversity module that interfaces properly with low-IF digital FM receivers. In particular, it is further desirable to provide for an RF receiver system and switched antenna diversity module that effectively controls selection of one of a plurality of antennas in a manner that reduces the multipath distortion in a mobile FM receiver.

SUMMARY OF THE INVENTION

According to one aspect of the present invention, an RF receiver system is provided having a plurality of selectable antennas. The system includes a receiver having front end circuitry and an analog-to-digital converter coupled to the front end circuitry for receiving RF signals from one of the plurality of antennas. The receiver further includes processing circuitry for processing the RF signals and generating a control signal to control selection of one of the plurality of antennas. The system further includes a switched diversity module having a plurality of switches coupled to the plurality of selectable antennas for selecting one of the plurality of antennas at a time. The switched diversity module further includes logic receiving the control signal generated by the processing circuitry in the receiver circuitry and generating logic output signals to control the plurality of switches to select one of the plurality of antennas at a time.

According to another aspect of the present invention, a switched diversity module for selecting one of a plurality of antennas at a time for use in an RF receiver system is provided. The switched diversity module includes a plurality of inputs coupled to associated ones of the plurality of antennas. The switched diversity module also has a plurality of switches coupled to the inputs for selecting one of the plurality of antennas at a time. The module has signal interface circuitry adapted to be coupled to a receiver for outputting the received RF signal to a receiver and for receiving from the receiver a control logic signal to select one of the plurality of antennas. The switched diversity module further includes logic configured to receive the control logic signal and generate output signals to control the plurality of switches to select one of the plurality of antennas at a time.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 6 is a timing diagram illustrating control signal Ctl transitions for selecting antenna switching;

FIG. 7 is a logic diagram of a state machine for implementing the logic in the remote diversity module of FIG. 3; and FIG. 8 is a truth table further illustrating the logic implemented in the state machine of FIG. 7.

DESCRIPTION OF THE PREFERRED EMBODIMENTS

Figure 1:
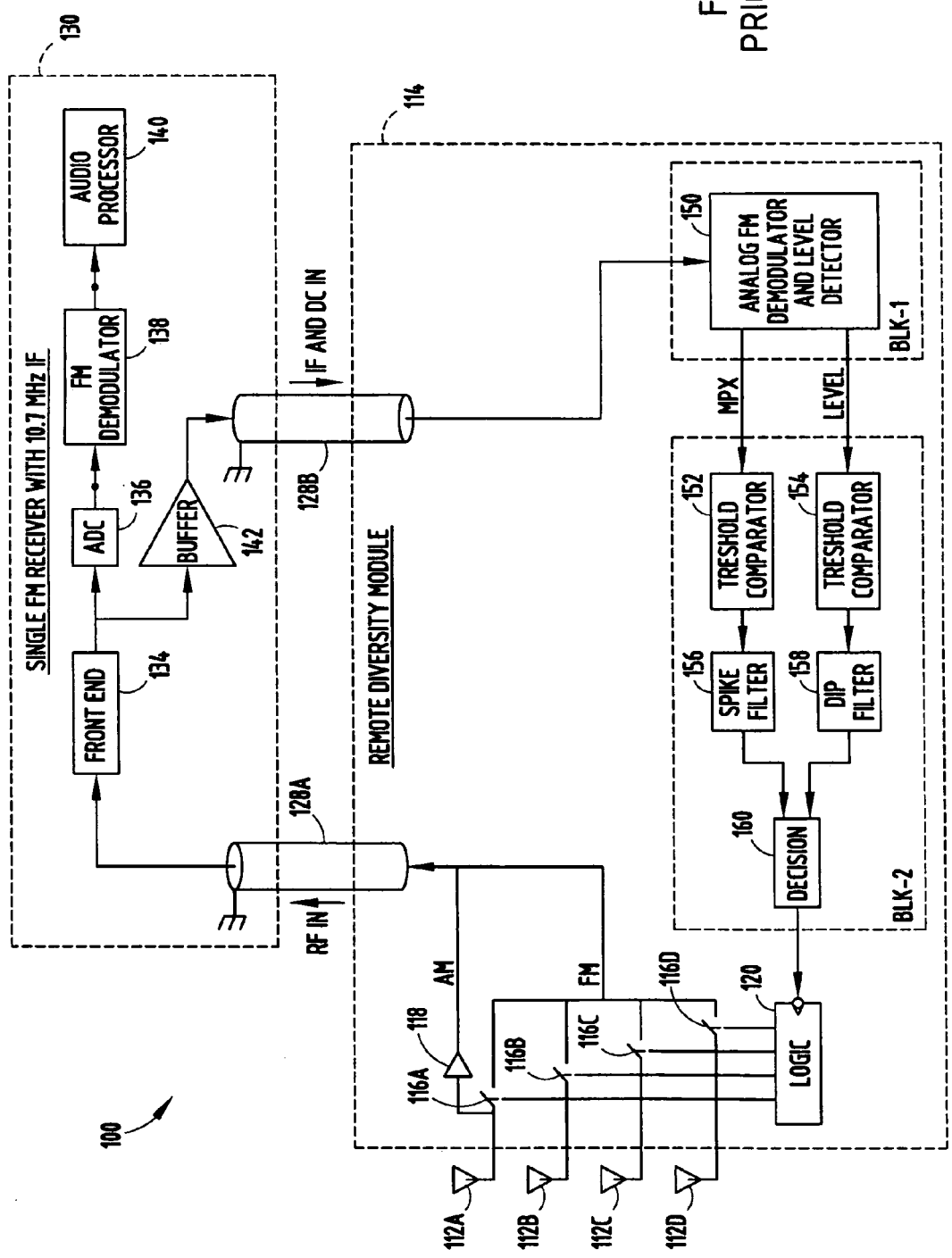
FIG. 1 is a block diagram of a conventional RF radio receiver system having a remote diversity module.
Figure 2:
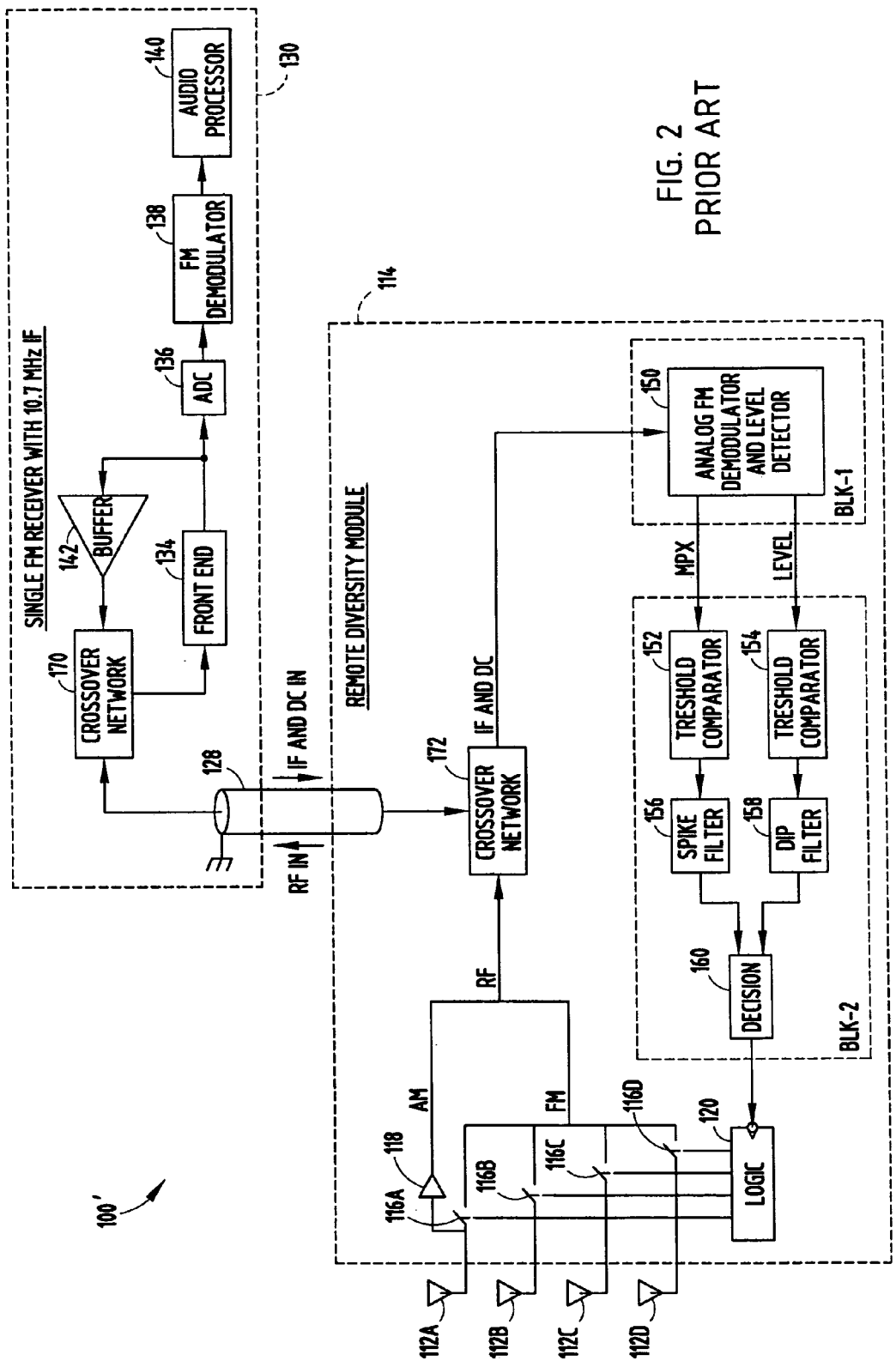
FIG. 2 is a block diagram of another conventional RF radio receiver system having a remote diversity module.
Figure 3:
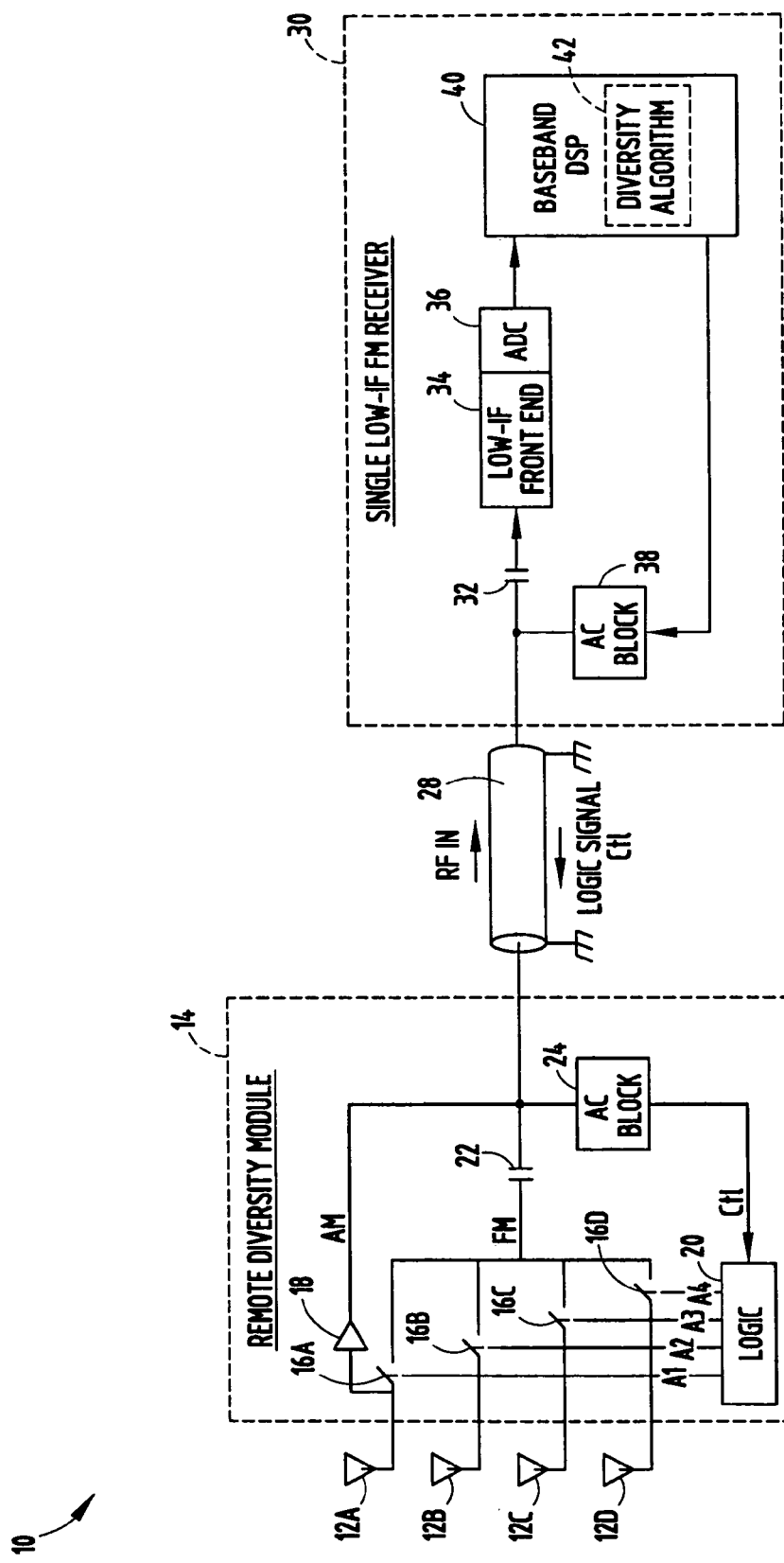
FIG. 3 is a block diagram illustrating an RF receiver system employing a remote diversity module and FM receiver according to one embodiment of the present invention.

Referring now to FIG. 3, an RF receiver system 10 is illustrated according to one embodiment of the present invention. The RF receiver system 10 includes a plurality of selectable antennas, shown in one exemplary embodiment as four antennas 12A-12D, each adapted to receive broadcast RF signals. The RF receiver system 10 also includes a remote diversity module 14 coupled to antennas 12A-12D for implementing switched antenna diversity. The RF receiver system 10 further includes an RF FM receiver 30 coupled to remote diversity module 14 via a two-way signal transmission line, shown as a single RF coaxial cable 28. The RF receiver system 10 shown and described herein provides a substantial reduction in cost and complexity of the switched antenna diversity module 14 and the resulting receiver system 10.

The plurality of antennas, shown according to one embodiment, as four separate antennas 12A-12D, may include any of a variety of active and/or passive antennas, such as whip antennas, patch antennas, etc., configured to receive wireless broadcast RF signals. The RF signals may include frequency modulated (FM) and amplitude modulated (AM) signals. The antennas 12A-12D may be located at various locations such as on a glass substrate, in a remote antenna module or may be located on or within the remote diversity module 14. According to one embodiment, the antennas 12A-12D may be located on a mobile vehicle, such as an automotive vehicle.

The remote diversity module 14 includes a plurality of switches 16A-16D, such as pin diodes. Switches 16A-16D are coupled to respective antennas 12A-12D and are operated (opened or closed) to control selection of the antennas 12A-12D, one at a time. In the embodiment shown, the switches 16A-16D are normally open when a low binary signal is applied thereto, and the switches 16A-16D move to a closed state when a high binary signal is applied to select the corresponding antenna.

Remote diversity module 14 further includes logic 20 which receives a control binary logic signal (Ctl) generated by intelligence in the receiver 30. Logic 20 is configured with logic gates and a state machine, without an expensive digital processor, and simply generates output binary logic signals A1-A4 responsive to control signal (Ctl) to control switches 16A-16D, respectively. Logic 20 selects one of switches 16A-16D at a time such as to allow RF signals received from the corresponding selected antenna to pass through capacitor 22 to receiver 30 through RF coaxial cable 28. Additionally, the AM signals are allowed to bypass the switches 16A-16D and pass through buffer 18 to the receiver 30 through coaxial cable 28. The remote diversity module 14 further includes an alternating current (AC) block 22 to block AC signals, while allowing the control signal Ctl generated in receiver 30 to pass through to logic 20.

The RF receiver 30 is shown as a single low-IF FM receiver implemented in a separate module, according to one embodiment. The FM receiver 30 includes a low-IF front end circuit 34 and an analog-to-digital converter (ADC) 36. RF signals received from the selected one of the plurality of antennas pass through capacitor 32 and RF cable 28 into receiver 30 and are processed by the front end circuit 34 and converted to a digital signal by ADC 36. The front end circuitry 34 may employ a low-IF analog circuit that mixes the received FM signals with a voltage controlled oscillator signal (VCO) to convert the signals to intermediate frequency (IF) generally in the range of 300 kHz to 10.7 MHz, according to one embodiment.

The digital signal output from ADC 36 is processed by a baseband digital signal processor (DSP) 40. The digital signal processor 40 may include an off the shelf digital signal processor and associated memory having intelligence capable of processing the RF signals. The digital signal processor 40 includes one or more switched diversity algorithms 42, including an algorithm for generating the output control signal Ctl for determining the selection of one of the plurality of antennas 12A-12D. The control signal Ctl is passed through AC block 38 as an input to logic 20 in the remote diversity module 14 via RF coaxial cable 28.

The digital signal processor 40 in receiver 30 may implement various diversity algorithms, such as those disclosed in co-pending U.S. application Ser. No. 11/201,883, filed on Aug. 11, 2005, the entire disclosure of which is hereby incorporated herein by reference. Generally speaking, the switched antenna diversity algorithm selects one of the plurality of antennas 12A-12D with the best or optimal signal-to-noise ratio (SNR). However, because only one of the antennas 12A-12D is selected at a given time, the diversity algorithm 42 generally determines the antenna selection based on incomplete knowledge.

Figure 4:
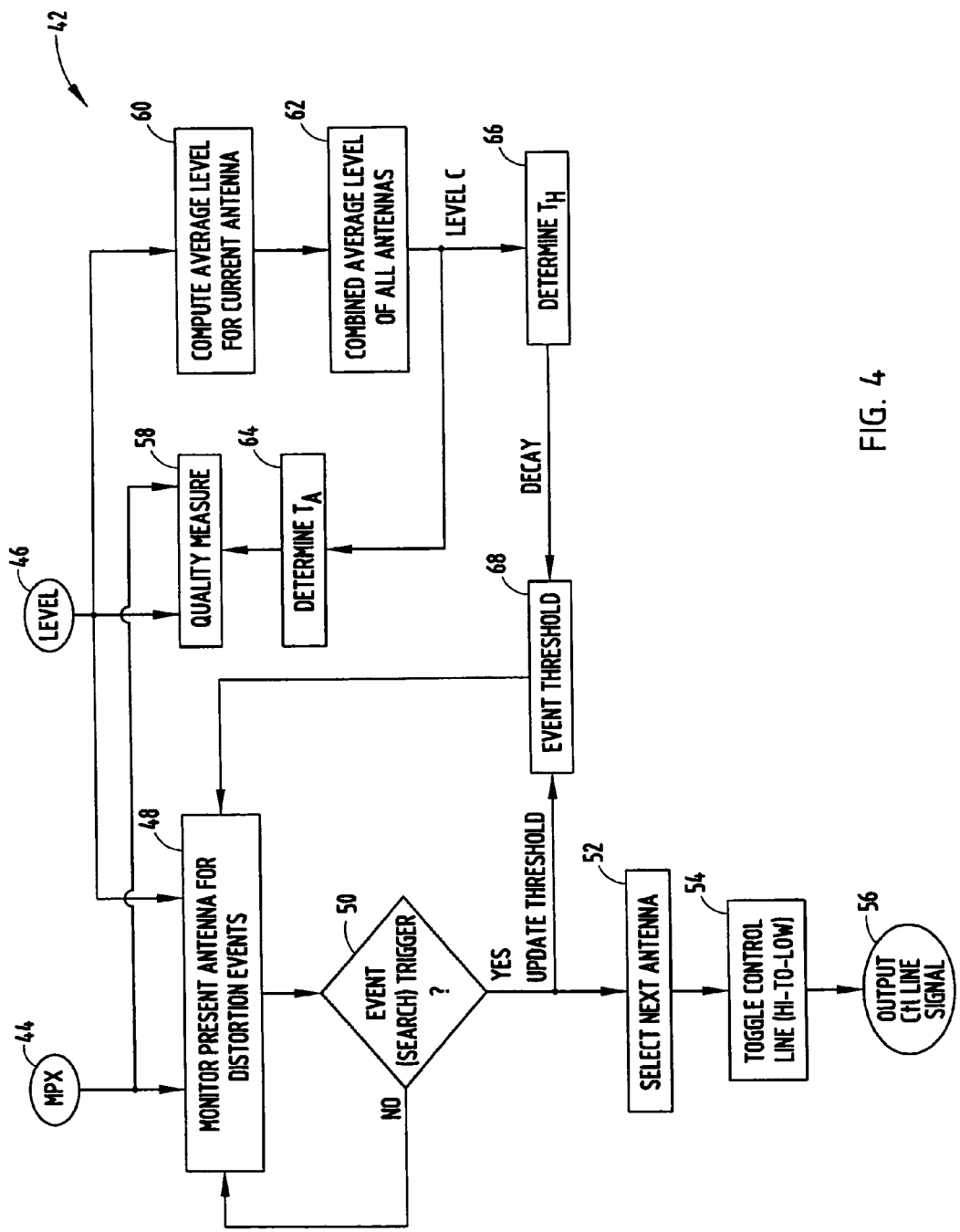
FIG. 4 is a flow/state diagram illustrating one embodiment of a switched antenna diversity algorithm executed by the digital signal processor in the receiver of FIG. 3.

Referring to FIG. 4, one exemplary embodiment of a diversity algorithm 42 is illustrated for generating the output control signal Ctl. The digitized signal output of the ADC 36 represents the predetected FM signal which is processed in software by a demodulator that performs FM detection on the signal to recover the FM multiplex (MPX) signal. The ADC signal is also level detected (AM detected) by an RF level detector in software to obtain the received signal strength, referred to herein as level. While the multiplexing and level detecting are shown implemented by the digital signal processor 40, it should be appreciated that other circuit arrangements may be provided to perform the functions thereof. According to this embodiment, the digital signal processor 40 receives the FM demodulator output signal MPX and the relative RF output signal level.

As shown, the methodology of algorithm 42 at steps 48 and 58 receive the MPX signal value and steps 48, 58 and 60 receive the RF level signal value. Step 48 represents a routine that monitors a present reference antenna for distortion events, which are indicated when an event threshold, provided in step 68, is exceeded. In decision step 50, when an event trigger occurs, control transfers to step 52 to select the next antenna. To select the next antenna, the control line is toggled from high to low in step 54 and an output control signal Ctl is output in step 56.

The quality of the signal received by the antennas is determined by a quality measure calculation in step 58. The average level for a current antenna is determined by a calculation in step 60. The average level is provided to another calculation in step 62, which combines the average level of all antennas to provide a combined average of all antennas signal (level C). The level C signal value is used in step 66 to calculate an event threshold decay time which is referred to as $T_H$. Decay time $T_H$ is used in step 68 to calculate the event threshold. The level C signal is also used in step 64 to calculate an average time $T_A$, which is used in step 58 to calculate the quality measure.

Accordingly, the diversity algorithm 42 monitors signal quality of the FM signal received by the selected one of the plurality of antennas. If the signal quality decays such that a more optimal signal quality is achieved with another antenna, the diversity algorithm 42 switches to the better quality antenna. In doing so, algorithm 42 outputs a high to low binary transition in control signal Ctl from the receiver 30 through the RF coaxial cable 28 to the logic 20 within the remote diversity module 14, which implements the switched antenna diversity operation.

Figure 5A:
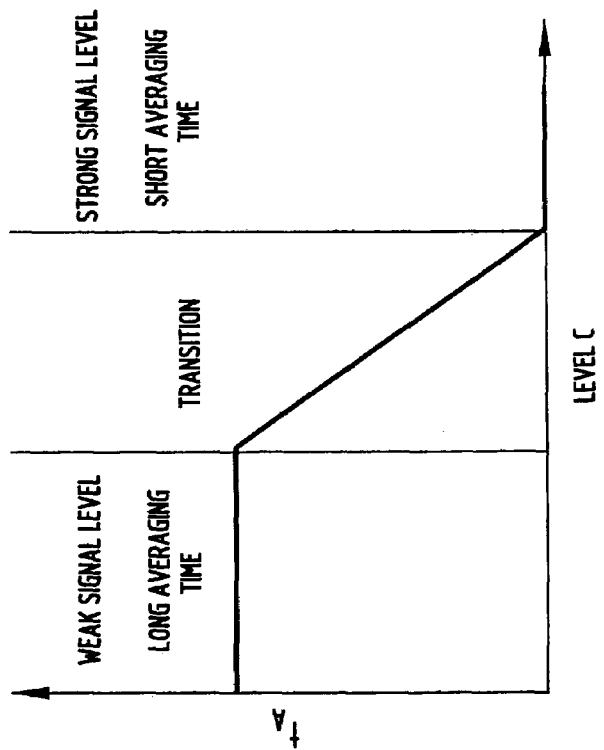
FIGS. 5A and 5B are graphs illustrating signal levels for generating the control signal Ctl in the receiver of FIG. 3.
Figure 5B:
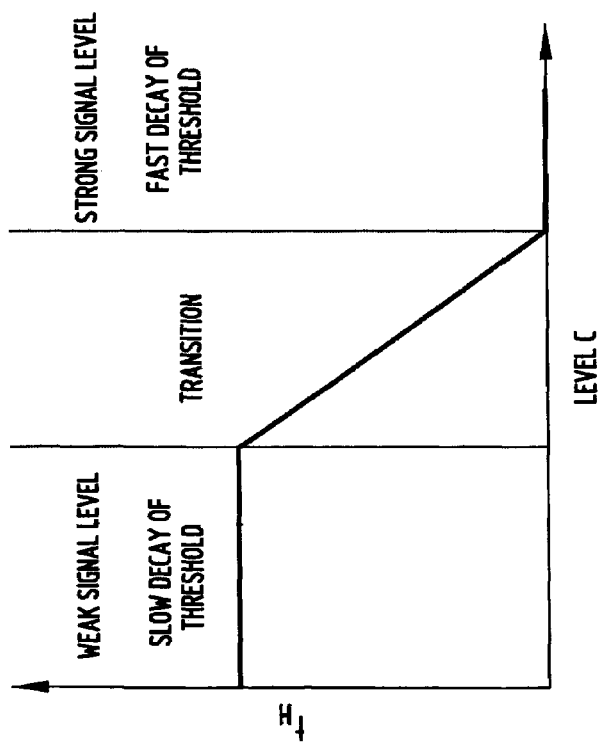

Referring to FIGS. 5A and 5B, examples of signal level quality and transitions are shown for the event threshold decay time $T_H$ and average time $T_A$. The level C signal is an RF average value. If the level C signal is strong, a low decay is employed. Contrarily, if the level C signal is weak, a fast decay is employed, as seen in FIG. 5A. In FIG. 5B, if a weak signal level is present, a long averaging time is employed. Contrarily, if a strong signal level is present, a short averaging time is employed to determine the signal quality.

Referring to FIG. 6, a timing diagram is shown for the logic block 20 in the switched diversity module 14. The control signal Ctl is shown with negative transitions which toggle the logic 20 to switch to the next successively selectable antenna. Each negative transition of control signal Ctl causes the next successive antenna to be switched in, one antenna at a time.

The remote diversity module 14 is a stand alone module that is separate and external remote) from the receiver 30 but is coupled thereto via the RF coaxial cable 28. The remote diversity module 14 and its logic, switches and interconnections is in a module that is separate from the receiver 30 and its processing circuitry. The remote diversity module 14 is simplified in that it employs simple logic 20 without expensive processing and avoids duplicative circuitry.

Referring to FIG. 7, one exemplary embodiment of a logic diagram for implementing the logic 20 is illustrated therein. According to the one embodiment, the logic 20 may be implemented with a multiplexer 86. The logic 20 includes the control signal line for receiving control signals Ctl coupled to the data inputs of the data flip-flops 82 and 84. Q output of data flip-flop 82 is coupled to Q1 input of the multiplexer 86, while $\overline{Q}$ output of data flip-flop 84 is coupled to Q2 input of the multiplexer 86. The Q of data flip-flop 84 is tied to the data input thereof. Additionally, an exclusive or logic gate 80 receives Q1 and Q2 inputs and provides an output to the data input of flip-flop 82.

The logic implemented by the logic block shown in FIG. 7 is illustrated in the truth table of FIG. 8. As shown, the logic generates output signals A1-A4 to control the state of switches 16A-16D to select one of the antennas 12A-12D at a time. The switching of antennas 12A-12D is initiated on negative transitions of the control logic signal Ctl according to one embodiment. The data flip-flop output logic D1 and D2 and state machine output logic A1, A2, A3 and A4 is illustrated below:

$D1 = Q1 \cdot \overline{Q2} + \overline{Q1} \cdot Q2$
$D2 = \overline{Q2}$
$A1 = \overline{C} + C \cdot \overline{Q1} \cdot \overline{Q2}$
$A2 = C \cdot \overline{Q1} \cdot Q2$
$A3 = C \cdot Q1 \cdot \overline{Q2}$
$A4 = C \cdot Q1 \cdot Q2$ Accordingly, the remote switched antenna diversity module 14 of the present invention advantageously provides for a low-cost RF receiver system 10 that effectively selects the antenna sequencing to maintain good or optimal FM signal reception. The RF receiver system 10 advantageously employs a single RF coaxial cable 28 and minimizes the complexity and cost of the remote diversity module 14. While the RF receiver system 10 is shown and described herein in connection with a single low-IF FM receiver, it should be appreciated that the remote diversity module may be employed in other RF receiver systems for processing other RF signals.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An RF receiver system comprising:
   a plurality of selectable antennas;
   a receiver comprising front end circuitry and an analog-to-digital converter coupled to the front end circuitry for receiving RF signals from one of the plurality of antennas, said receiver further comprising processing circuitry for processing the RF signals and generating a control signal comprising a binary logic signal to control selection of one of the plurality of antennas; and
   a switched diversity module comprising a plurality of switches coupled to said plurality of selectable antennas for selecting one of the plurality of antennas at a time, said switched diversity module further comprising logic receiving the control signal including the binary logic signal generated by the processing circuitry in the receiver and generating logic output signals to control the plurality of switches to select one of the plurality of antennas at a time, wherein said control signal causes selection of a different one of the plurality of antennas at a time when the binary logic signal transitions between two states.

2. The receiver system as defined in claim 1 further comprising an RF signal transmission line coupled between the switched diversity module and the receiver.

3. The receiver system as defined in claim 2, wherein the signal transmission line consists of a single RF coaxial cable.

4. The receiver system as defined in claim 2, wherein the received RF signals and the control signal are transmitted between the receiver and the logic in the switched diversity module via the RF signal transmission line.

5. The receiver system as defined in claim 1, wherein the logic comprises a state machine.

6. The receiver system as defined in claim 5, wherein the logic further comprises logic gates.

7. The receiver system as defined in claim 1, wherein the receiver comprises a module that is remote from the switched diversity module.

8. The receiver system as defined in claim 1, wherein said binary logic signal transitions between a high binary state and a low binary state.

9. The receiver system as defined in claim 1, wherein the receiver system is employed on a vehicle.

10. The receiver system as defined in claim 1, wherein the receiver comprises a low-IF FM receiver for receiving and processing RF FM signals.

11. A switched diversity module for selecting one of a plurality of antennas at a time for use in an RF receiver system, said switched diversity module comprising:
- a plurality of inputs coupled to associated ones of a plurality of selectable antennas;
- a plurality of switches coupled to said plurality of inputs for selecting one of the plurality of antennas at a time;
- signal interface circuitry adapted to be coupled to a receiver for outputting the received RF signal to the receiver and for receiving from the receiver a control signal to select one of the plurality of antennas, wherein the control signal comprises a binary logic signal; and
- logic configured to receive the control signal including the binary logic signal and generate output signals to control the plurality of switches to select one of the plurality of antennas at a time, wherein said control signal causes selection of a different one of the plurality of antennas at a time when the binary logic signal transitions between two states.

12. The switched diversity module as defined in claim 11, wherein the logic comprises a state machine.

13. The switched diversity module as defined in claim 12, wherein the logic further comprises logic gates.

14. The switched diversity module as defined in claim 11, wherein the signal interface circuitry is adapted to connect to an RF signal transmission line which connects to a receiver module.

15. The switched diversity module as defined in claim 14, wherein the signal interface circuitry is adapted to connect to the RF signal transmission line consisting of a single RF coaxial cable.

16. The switched diversity module as defined in claim 14, wherein the received RF signals and the control signal are adapted to be transmitted between the receiver module and the logic in the switched diversity module via the RF signal transmission line.

17. The switched diversity module as defined in claim 11, wherein the receiver comprises a module that is remote from the switched diversity module.

18. The switched diversity module as defined in claim 11, wherein said binary logic signal transitions between a high binary state and a low binary state.

19. The switched diversity module as defined in claim 11, wherein the switched diversity module is employed on a vehicle.

20. The switched diversity module as defined in claim 11, wherein the switched diversity module selects one of a plurality of antennas at a time for use in a low-IF FM receiver for processing FM signals.

* * * * *